July 31, 1962 F. DER YUEN 3,046,908
APPARATUS FOR FACILITATING THE LOADING AND UNLOADING
OF PASSENGERS AND CARGO
Filed Aug. 31, 1959 8 Sheets-Sheet 5
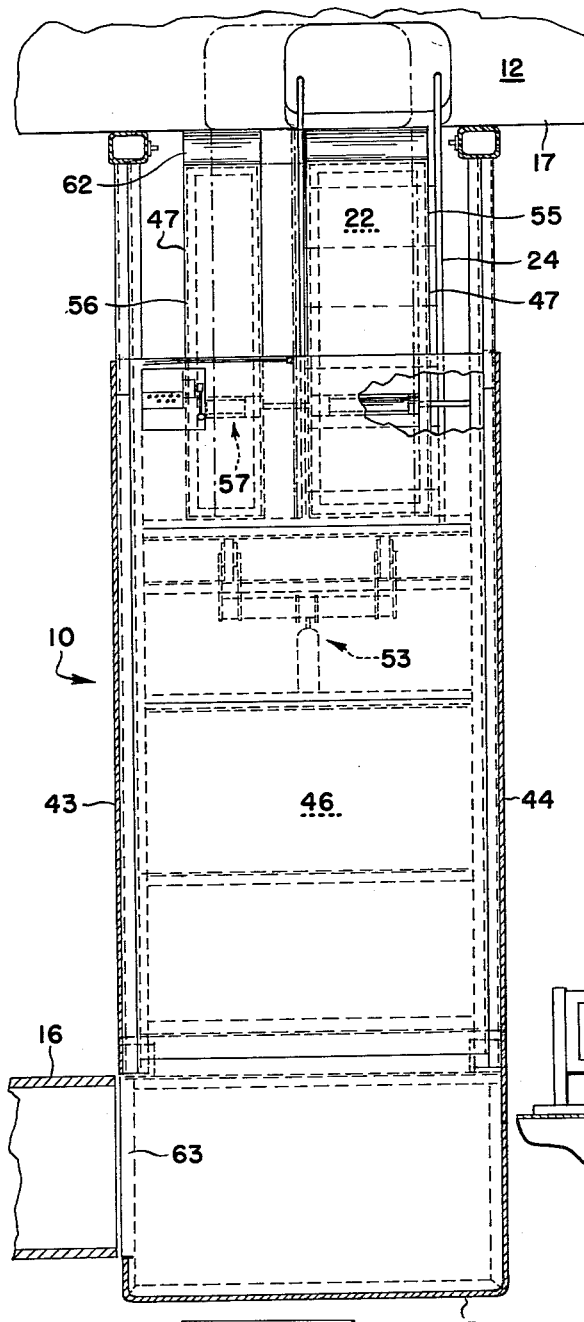
Fig. 6
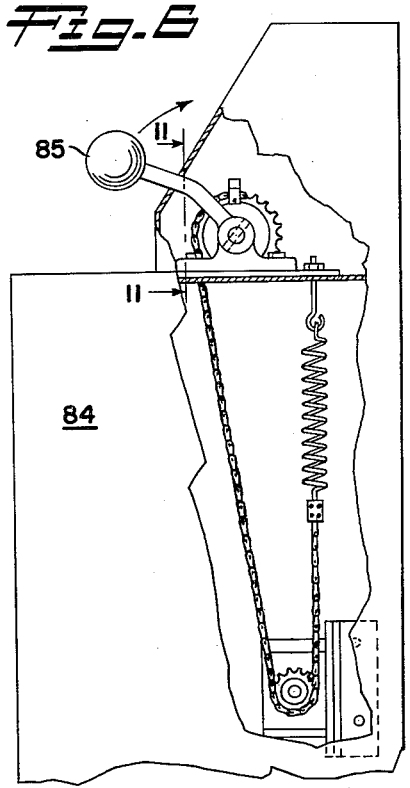
Fig. 10
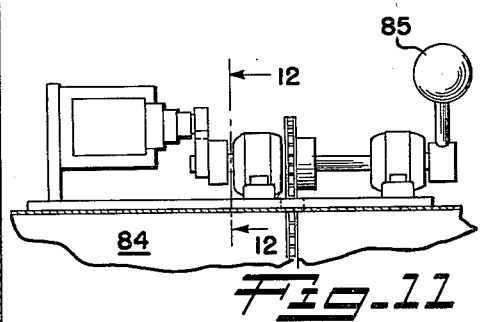
Fig. 11
Fig. 12
INVENTOR.
FRANK DER YUEN
BY
George C. Sullivan
Agent

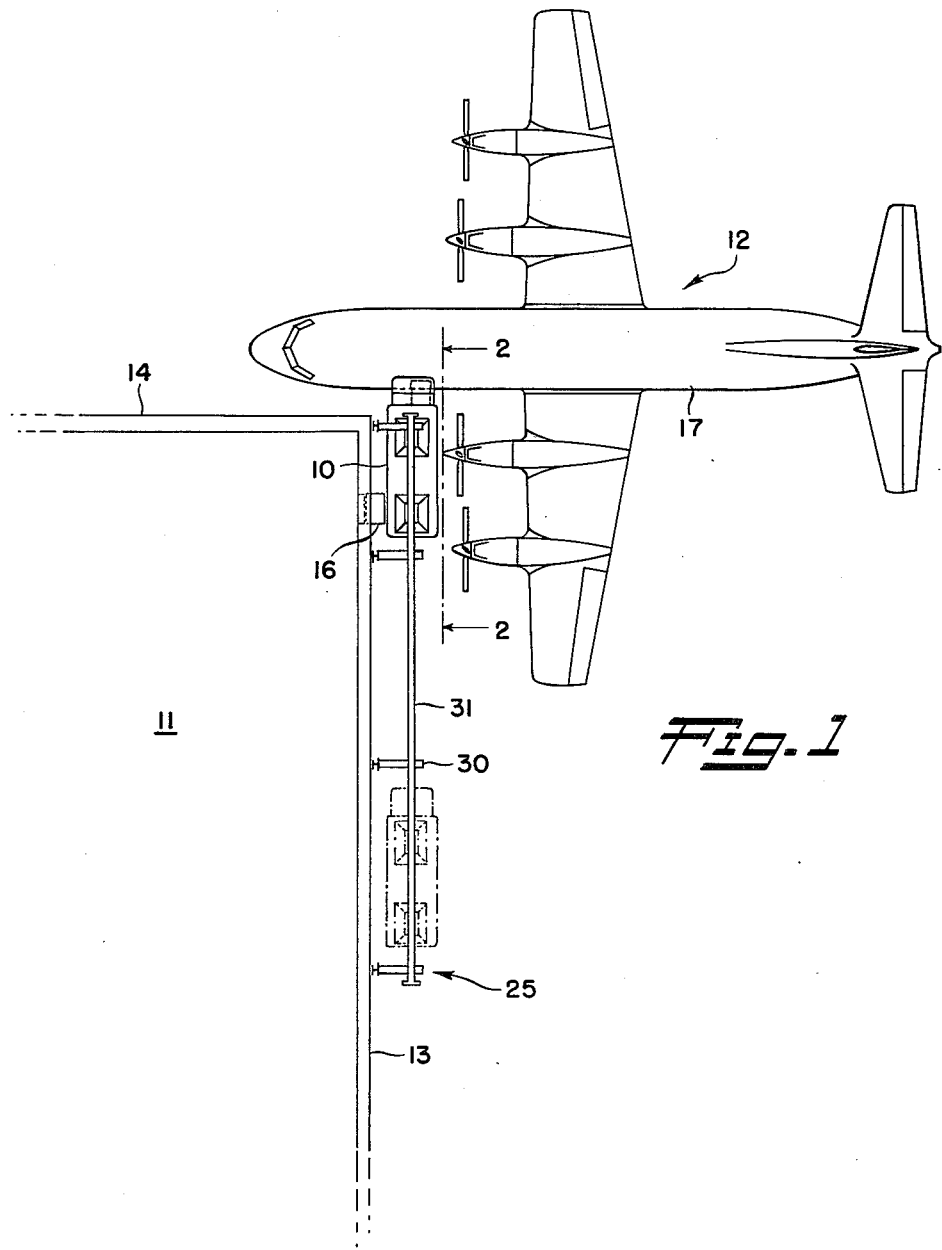

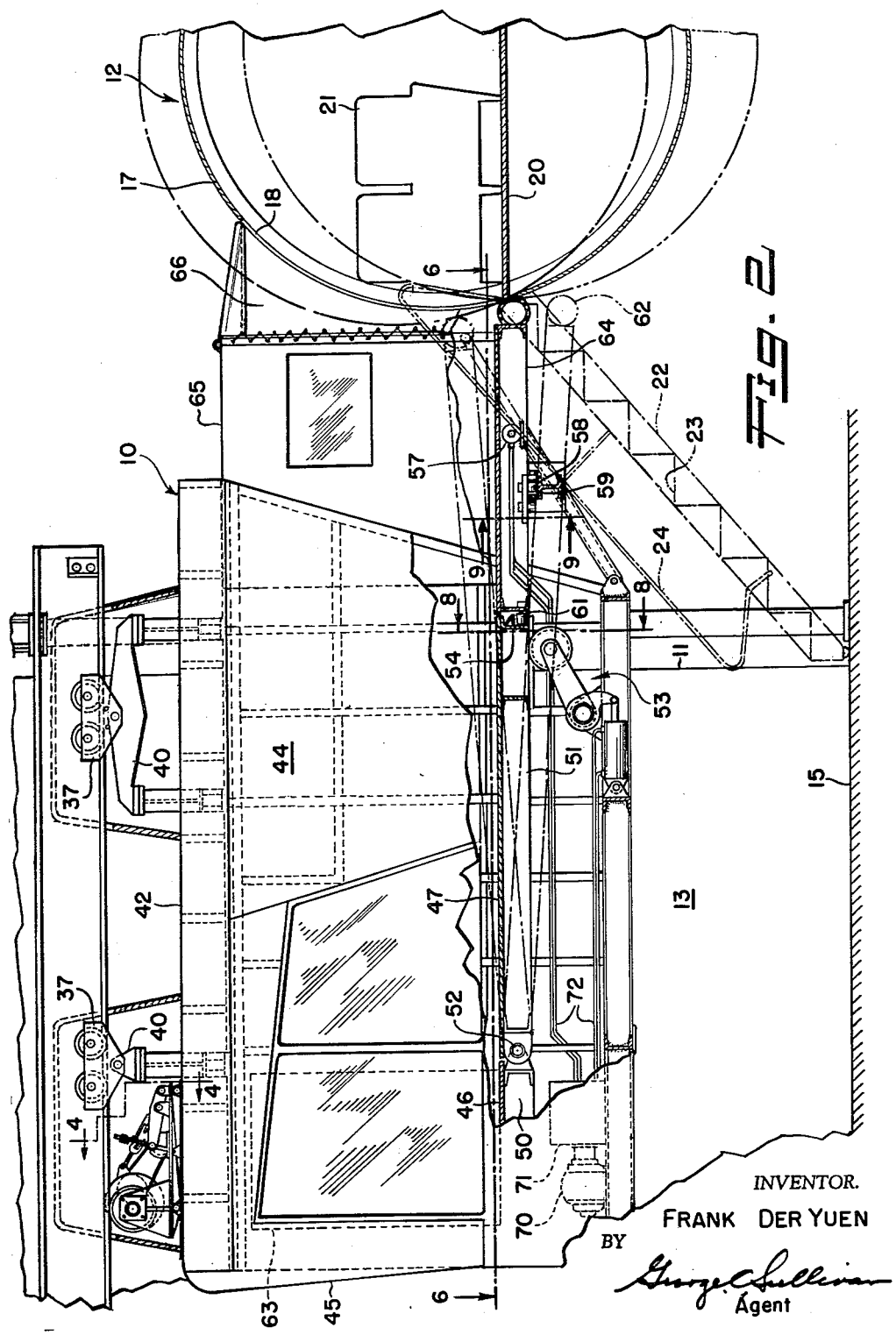

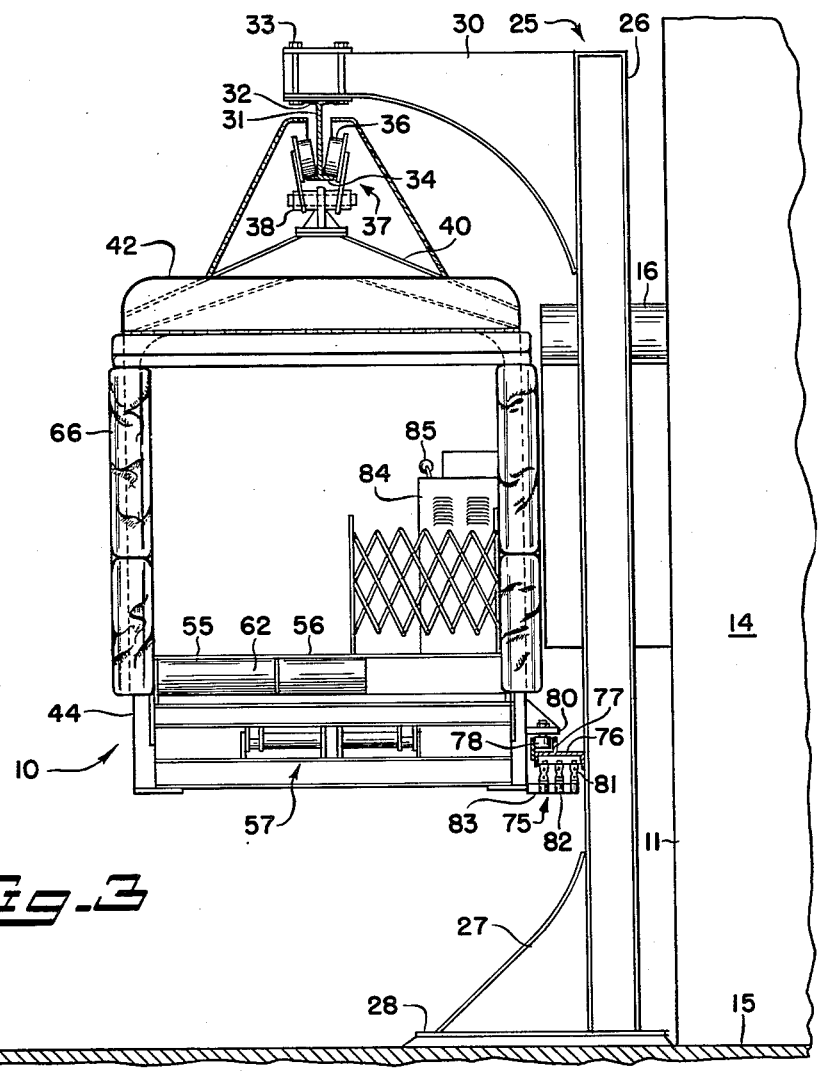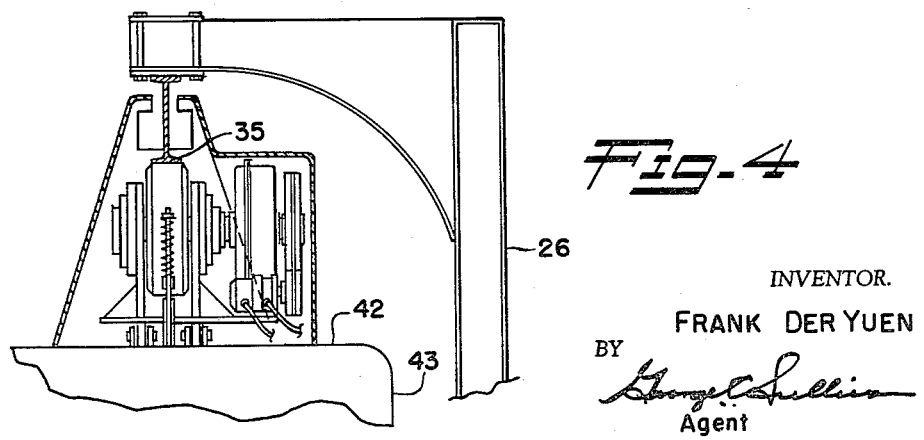

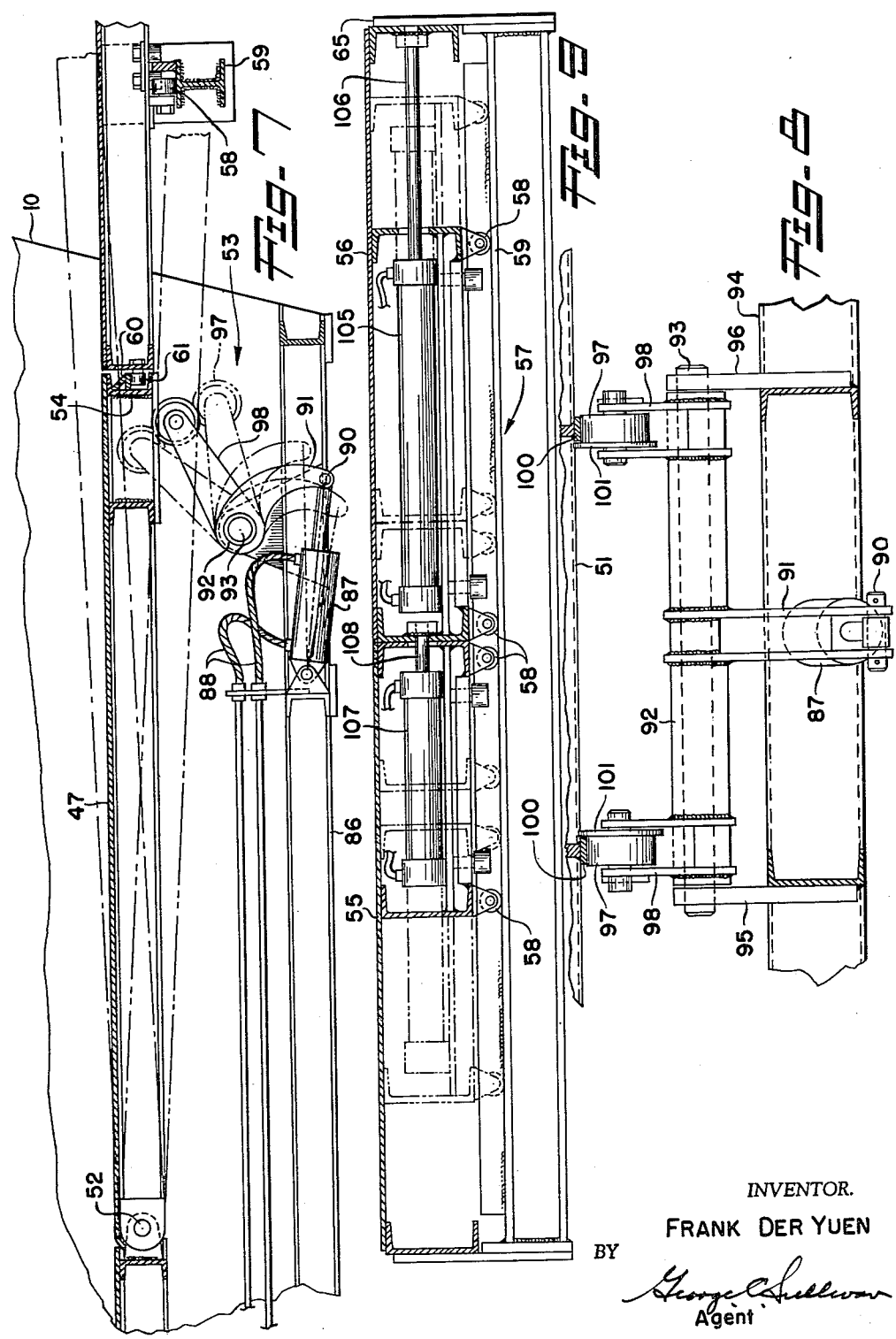

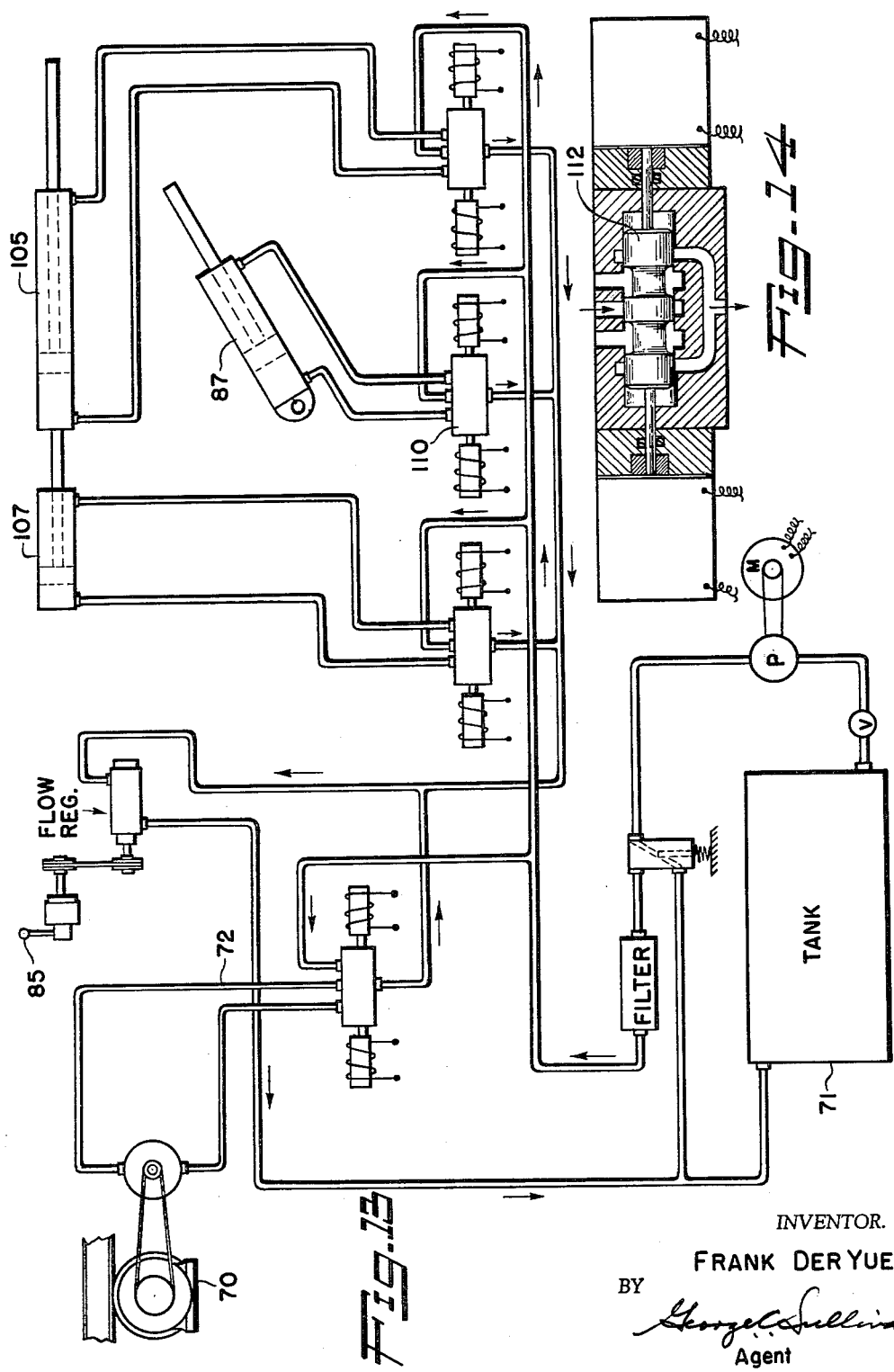

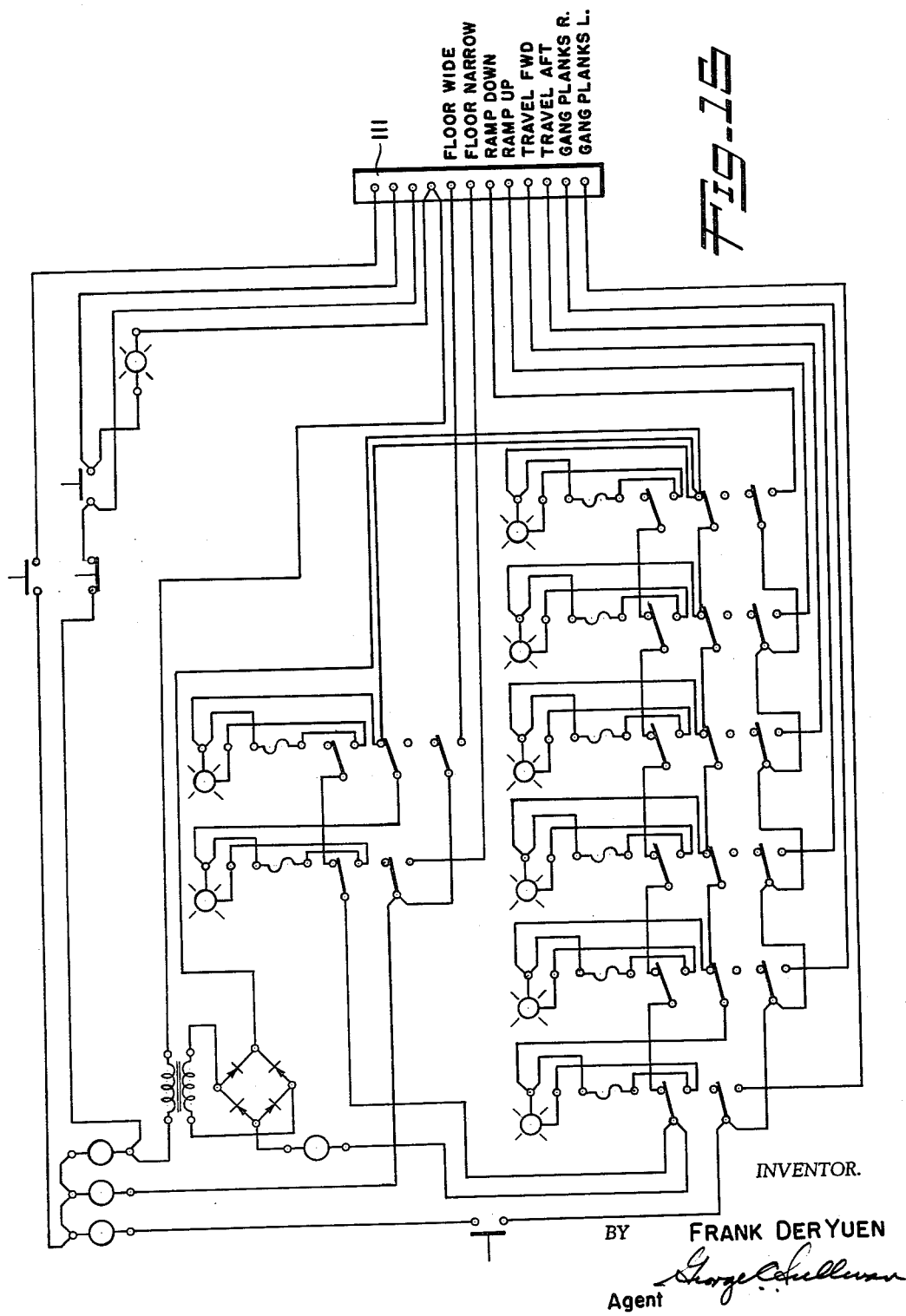

United States Patent Office 3,046,908
Patented July 31, 1962

3,046,908
APPARATUS FOR FACILITATING THE LOADING AND UNLOADING OF PASSENGERS AND CARGO
Frank Der Yuen, Inglewood, Calif., assignor to Lockheed Air Terminal, Inc., Burbank, Calif.
Filed Aug. 31, 1959, Ser. No. 838,016
10 Claims. (Cl. 104—20)

This invention relates to passenger and cargo handling equipment and more particularly to apparatus for facilitating the loading and unloading of aircraft at a terminal.

Although the difficulty of efficiently loading and unloading vehicles, such as aircraft, has been recognized for a number of years, the recent steady increase in both the size of vehicles and in the case of aircraft, the volume of air traffic has brought the problem to a critical state. At present, for example, aircraft after landing at an airport are maneuvered under their own power to an assigned loading or unloading zone which must necessarily be at least a circle having a diameter somewhat larger than the greatest dimension of the aircraft. Although such generous allowance of such space seems essential, it is obvious that a majority of the area thus employed is not directly utilized in loading or unloading the aircraft. It is also appreciated that all cargo or passengers are generally located in a depot or terminal elevated above the aircraft parkway and that a certain area exists between the door of the aircraft and the platform or door of the terminal and that the passengers or cargo must traverse this area in order to achieve access to the aircraft.

Expert studying of the problem of efficiently handling aircraft and their cargo and passengers on the ground has given considerable attention to movable structures adapted to be placed in position between parked aircraft and a terminal building near each loading zone. However, several serious deficiencies are encountered with these conventional structures which appear inherent in portable or movable structures of this type. For example, since it is difficult to repeatedly position an aircraft in an exact location with respect to the terminal, the outer end of the structure which connects the aircraft and building must be movable in an arc or at least a complex curve in order to avoid the tail assembly, and must be collapsible and extendable and it must be capable of withstanding considerable load. Combined with these requirements, it must also be easily and quickly maneuverable as well as of reasonable cost.

Furthermore, bridges of conventional design are not suitable for mating with an aircraft having its door forward of the aircraft wings since the general position of the aircraft in its loading position and the location of the wing are major obstacles to a conventional type bridge. Inasmuch as wings on present day aircraft are rapidly increasing in length, it requires that conventional bridges be quite long and heavy in order to extend from the terminal to the aircraft doorway. Also, other problems have been encountered with conventional bridges since means are not provided for adjusting the loading ramp carried by the bridge according to the width of the aircraft doorway as the width of the doorway may change from one aircraft design to another. Conventional bridges for this purpose generally lack means for adjusting the end of the ramp from the ground in order to compensate for the varying heights of different aircraft designs.

In accordance with the present invention, a loading and unloading apparatus is provided for passengers and cargo which readily connects an elevated floor or platform of a terminal with the elevated or raised door of a transportation vehicle, such as an aircraft. The invention effects communication between the terminal and the aircraft by means of an enclosed car carried on a rail leading from the terminal to the aircraft parkway. The rail serves to support and guide the car as it progresses back and forth on the rail or in its stationary position. The car may be loaded with either passengers or cargo on the floor or deck of the terminal and powered to the end of its supporting and guiding rail to a position adjacent the aircraft. A ramp is pivotally carried on the car and extends beyond the car into engagement with the aircraft about the doorway.

Passengers and cargo may now be transferred from the car directly into the aircraft and vice versa over the extended ramp. The present invention further includes means for elevating the end of the ramp adjacent the airplane doorway and means for adjusting the width of the ramp to accommodate varying doorway widths of different aircraft designs or to accommodate an aircraft which is off position in the parkway. In this manner, passengers or cargo are contained within the car completely sheltered from external environmental exposure such as to wind, rain, snow, propeller or jet blast, etc.

A feature resides in the application of the present invention in instances where the doorway in the terminal is adjacent the corner of the terminal building and the nose of the aircraft is directed into a parkway for the aircraft adjacent the corner of the building. In this instance, after the airplane has been parked with its forward door adjacent the corner of the building, the car of the present invention may be positioned such that the car itself provides a fixed corridor from the doorway in the corner of the building to the doorway of the aircraft so that ingress and egress of both the aircraft and the building is readily available. In this instance, it is necessary only for the car to move or extend from the building in the minimum range of from six to eight feet.

Therefore, a primary object of this invention is to provide apparatus suitable for permanent installation at airports or other vehicle terminal areas for facilitating efficient loading and unloading of vehicle passengers and cargo.

It is another object of this invention to include the provision of a car for moving passengers or cargo along a fixed predetermined path from a fixed building to a waiting aircraft parked on the runway or taxi-way of the airport, the vehicle adapted to abut the sill of an aircraft hatchway or doorway when the vehicle has been moved into its loading position.

Further objects of this invention include the provision of a pier or dock building from which passengers or cargo are loaded or unloaded by means of a vehicle which travels between the loading floor or platform and a waiting aircraft; such vehicle incorporating means for protecting aircraft cargo and passengers from the weather; for facilitating the movement of such passengers and cargo between an aircraft and a terminal building, which incorporates means for adjusting the position of an extended ramp of the vehicle in such a manner as to accommodate aircraft having doorway sills of varying heights, widths and locations; the provision of a compact and efficient supporting system for the loading and unloading vehicle; and the provision of suitable vehicles, rails and power means for moving the vehicles along the rails, all arranged in such manner as to present a minimum safety hazard to moving aircraft and to avoid interference with a normal traffic flow of aircraft and ground vehicles at the airport.

Several other objects, as well as many of the advantages of this invention will become apparent to those skilled in the art from the following description and when taken in connection with the appended drawings, in which:

FIGURE 1 is a plan view of the presnt invention shown in position for communicating a terminal building with an aircraft;

FIGURE 2 is a side elevational view, partly in section, of the apparatus of the present invention showing the general structure and arrangement of the car or vehicle of the present invention and a typical aircraft having an extended stairway shown in the direction of arrows 2—2 of FIGURE 1;

FIGURE 3 is an end view of the vehicle of FIGURE 2 showing the suspension and supporting means for the vehicle;

FIGURE 4 is an enlarged view of the driving means for the vehicle taken in the direction of arrows 4—4 of FIGURE 2;

FIGURE 6 is a horizontal sectional view of the vehicle of FIGURE 2 taken in the direction of arrows 6—6;

FIGURE 7 is a side view, partly in section, of means carried by the vehicle for elevating the platform of FIGURE 2;

FIGURE 8 is an enlarged front view of the means shown in FIGURE 7 taken in the direction of arrows 8—8 of FIGURE 2;

FIGURE 9 is an enlarged sectional view of the means employed in the vehicle for positioning the segmented ramps for adjusting or selecting the effective width of the ramp taken in the direction of arrows 9—9 of FIGURE 2;

FIGURE 10 is an enlarged fragmentary view, partly in section, of the manual control means shown in FIGURE 3 for moving the segmented platforms to their selected and operative positions;

FIGURE 11 is a sectional view of the control means taken in the direction of arrows 11—11 of FIGURE 10;

FIGURE 12 is a sectional view of the control means taken in the direction of arrows 12—12 of FIGURE 11;

FIGURE 13 is a schematic drawing of the hydraulic system employed for elevating the ramp and adjusting the ramp segments;

FIGURE 14 is an enlarged sectional view of a solenoid operated valve employed in the system of FIGURE 13; and FIGURE 15 is a schematic drawing of the electrical system employed in controlling the operation of the vehicle as well as the solenoid operated valves employed in the hydraulic system of FIGURE 13.

Figure 5:
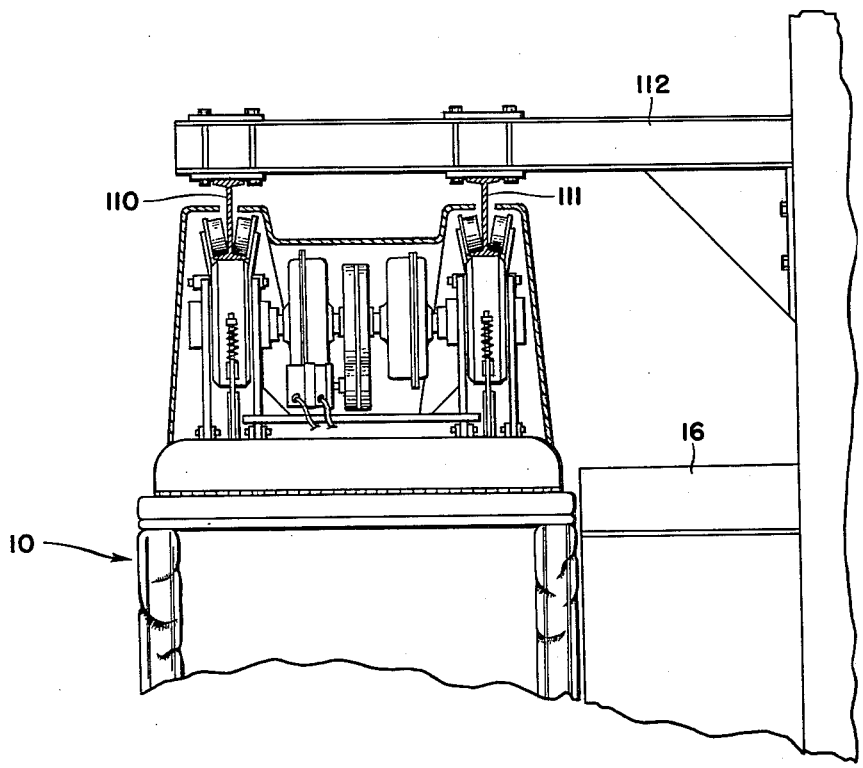
FIGURE 5 is an enlarged view of another suspension and driving means system for the vehicle incorporated in the present invention.

Referring to FIGURES 1, 2 and 3, a vehicle passageway or car 10 is shown which communicates a terminal building 11 with a commercial transportation vehicle which in the present instance is shown as an airplane 12. The portion of the building 11 shown in FIGURES 2 and 3 illustrates the corner of the building formed by joining sides 13 and 14 and wherein the building is raised above a ground level 15. Side 13 of the building is provided with a covered entrance or port 16 leading from the interior of the building exteriorly of side 13. The building may be employed for storing cargo as in a warehouse application or the building may be a passenger depot where passengers gather to board the airplane. It should be appreciated that the port 16 is located at an elevated level from the ground surface 15 and that a floor (not shown) provided in the building mates with the lower sill of the port so that passage through the port may be readily had.

The airplane 12 is shown with a conventional fuselage 17 having a hatch or doorway 18 provided for ingress and egress therethrough into and out of the fuselage. At the base of the doorway in the fuselage, a floor 20 is provided which provides a walkway and an aisle through the fuselage of the airplane and also a means for supporting such furnishings in a passenger transport as seats 21. In some recently developed airplanes, stairways are provided leading from the doorway and floor of the fuselage to the ground 15. Stairway 22 is shown in broken lines and employs a plurality of stairs 23 and a rigid handrail assembly 24. Normally, the employment of a stairway which is carried by the airplane presents a problem for loading platforms since the platform or ramp must have the capabilities of abutting against the doorway at the fuselage floor level without encountering interference from the stairway or the rigid handrails when the stairway has been extended.

Adjacent to wall 13 of building 11 and supported on the ground 15, there is provided a support and guiding assembly 25 for the car or vehicle 10. Such an assembly may comprise a plurality of main supporting posts 26 arranged at regular intervals and sustained in vertical position by means of braces 27 and foundation 28. Sustained upon the posts 26 are longitudinally extending beams or ties 30 and secured upon the ties 30 is a car support and guide means which is a monorail 31. It is to be understood that this means may be supported by the building if desirable.

The monorail 31 is in the form of a conventional I beam wherein the upper flange of the beam is secured to each tie 30 by means of bolt and nut arrangement 33. The lower flange 34 serves as the main support for the car wherein flange 34 has slightly angularly disposed surfaces 35 on which guide rollers 36 are adapted to ride. These rollers 36 are carried by substantially vertically disposed carriages 37 which are secured to the top of the car 10 by a suitable connector means 38. The carriages 37 including the wheels 36 allow for movement of the car 10 over the full length of the monorail 31. It is noted in FIGURES 2 and 3 in particular that the carriages 36 are joined to the top of the car framework by means of frames 40 associated with each carriage 36.

Car 10 is defined as a main section and is enclosed by a roof 42, opposing sides 43 and 44 and an end wall 45. However, it is to be noted that the end of the car opposite to end wall 45 is open. Also, the floor of the car is made up of a stationary section 46 and a ramp section 47. Section 46 is supported on a frame 50 which is secured to the opposite walls of the car and abuts against end wall 45. However, ramp 47 is carried on a frame 51 which is pivotally secured to frame 50 by means of a pivot arrangement 52. Ramp 47 may be raised or lowered by an actuating mechanism shown by the reference character 53. The end of ramp section 47 opposite to the pivot arrangement 52 is provided with a laterally extending support member 54 which carries split floor sections 55 and 56 which are arranged to move laterally.

An actuating mechanism represented by the general reference numeral 57 is employed for positioning both forward sections 55 and 56 laterally with respect to the car or this mechanism may position either of the floor sections independently to be described later in detail. The laterally movable floor sections 55 and 56 are supported on rollers 58 which traverse a beam member 59 communicating with opposite sides of the car. Also, member 54 provides a flange 60 on which a plurality of rollers 61 travel and lend additional support to the floor sections. The ends of the laterally movable floor sections are provided with bumper means 62 which are intended to abut against the vehicle which is to be loaded or unloaded via car 10. In the present instance, airplane 12 is shown; however, it is to be understood that any transportation vehicle such as a train, truck, boat, etc., may be employed for the purposes of the present invention.

Inasmuch as the loading door for the vehicle may differ from one model to another, floor segment 55 is preferably wider than segment 56 so that segment 55 may be positioned between the rigid handrails of a stairway 22, if such a stairway is provided on the vehicle, and into abutting engagement with the side of the floor of the vehicle adjacent the door. However, if a vehicle is employed with a wider doorway, segments 55 and 56 may be adjusted adjacent one another and placed in abutment with a wider or larger door of a different type vehicle.

A motor 70 and hydraulic reservoir 71 are carried on the car 10 beneath the floor section 46 for supplying the actuating mechanism 53 and 57 with a suitable hydraulic fluid via lines 72. However, it will be appreciated that this mechanism may take other forms such as screw jacks and separate electric motors for example.

Provided through side 44, is a doorway 63 which may be slid open or closed in order to mate with port 16 to allow passengers and/or cargo to enter the car 10 from the terminal or depot building 11. Projecting through the open end of car 10 and mounted on framework 64 is a vestibule 65 which covers the laterally moving floor sections and follows the vertical movement about pivot point 52. The vestibule is smaller in height than the car 10 and a portion of the vestibule is enclosed and covered by the car 10 through its open end. Secured to the outer portion of the vestibule adjacent the cushion 62, there is provided a contour cushion 66 which is adaptable to surround the doorway leading into the vehicle. This cushion is highly resilient and may take the form of a pneumatic cushion, canvas covered resilient material or other suitable pads. The cushion 66 is arranged so that the open end of the vestibule may be mated with the transportation vehicle without damaging either the vestibule or the vehicle.

As illustrated in FIGURE 3, car 10 of the present invention is shown suspended from the rail 31 and means represented by the general reference numeral 75 are provided for stabilizing said car while the car travels along the rail 31. Means 75 comprises, in general, a rail 76 having a channel section 77 for receiving rollers 78 carried on the car by means of a flange 80. It is to be appreciated that channel section 77 is secured to the plurality of supporting posts 26 in fixed spaced relationship relative to the rail 31 and that roller 78 and the channel 77 provided on rail 76 cooperate with rollers 36 and rail 31 to stabilize car 10 to prevent the car from swinging while traveling on the rail 31 or when the car is stationary for receiving passengers or cargo. It is also to be noted that beneath rail 76, there is provided various bus lines 81 which cooperate with brushes 82 carried by a member 83 supported on the bottom of the car for providing the car with electrical power. The electrical source, such as a generator, is generally provided in the depot building 11 and is tied to the bus lines 81 over which the brushes 82 travel upon movement of the car. In any event these brushes remain in contact with the bus lines 81 to provide electrical power for lighting the interior of the car and for motor operation.

Adjacent the open end of the car and covered by the roof of the car, there is provided a control stand or cabinet 84 enclosing suitable mechanisms and means operable by a handle 85 and various push buttons, not shown, for controlling the movement of car 10 and for actuating and controlling mechanism 53 and 57.

With respect to FIGURE 7, a bottom structure 86 for car 10 is provided for pivotally mounting a hydraulic assemblage 87 forming a part of actuating mechanism 53. The piston and cylinder assemblage 87 is provided with hydraulic fluid via leads 88 which cause the piston of the assemblage to forceably extend and retract into the cylinder. Attached to the free end of the piston by a pivotal arrangement 90 there is provided a lever 91 having its end opposite to pivot connection 90 secured to a sleeve 92 which is adapted for limited rotation. Sleeve 92 rotates about an axle 93 which is mounted on opposite ends to a portion of a frame 94 via mounts 95 and 96 respectively. As shown more clearly in FIGURE 8, the opposite ends of sleeve 92 which rotate about axle 93 are provided with a pair of rollers 97 via a mounting arrangement 98 which travel on a pair of fixed rails or tracks 100 which are fixed beneath the floor section 47 on member 51. The pair of tracks 100 are arranged in fixed parallel spaced relationship and rollers 97 are guided on the tracks by means of flanges 101 provided on the inside of each roller.

Therefore, it can be appreciated that the extension of the piston and cylinder assembly 87 will cause sleeve 92 to rotate on axle 93 via lever 91, which in turn, causes rollers 97 to travel on tracks 100. The movement of the rollers is not only horizontal along the tracks, but vertical in that roller mountings 98 are longer than member 91 so that the counter clockwise rotation of sleeve 92 causes the rollers to move upward. This movement in turn causes the ramp 47 to raise upward and pivot about pivot arrangement 52. In the event the piston is retracted within the cylinder of piston and cylinder arrangement 87, the ramp is lowered and caused to pivot downward about pivot arrangement 52 via the mechanism described above.

With respect to FIGURE 9, actuating mechanism 57 is shown for positioning the floor sections 55 and 56 either separately or in unison. It is noted in FIGURE 9 that section 56 has connected thereto a cylinder 105 and a piston 106 projecting from the cylinder and having its free end attached to the side of the vestibule 65. As shown in broken lines, the piston 106 is retracted into cylinder 105 which causes the floor section 56 to advance towards the permanently secured free end of piston 106 to the supporting frame of the vestibule. However, when expanded, floor section 56 is moved away from the supporting section of the vestibule as shown in solid lines. The floor section is movable on rollers 58 over beam member 59. The rear end of section 56 is supported on beam member 54 by means of rollers 61. Floor section 55 is provided with a piston and cylinder assemblage having a cylinder 107 and a piston 108. The free end of piston 108 is secured to floor section 56 so that floor section 55 may be moved away from floor section 56 by actuating the piston and cylinder assemblage such that piston 108 is extended from cylinder 107 which causes floor section 55 to move into the position shown in FIGURE 9 represented by broken lines. Floor section 55 moves on wheels or rollers 58 on beam member 54 and also on rollers 61. Therefore, if it is desirable to move both floor sections 55 and 56 together, it is necessary to actuate only piston 106 and cylinder 105. However, if it is desirable to position only floor section 55 it is necessary to only actuate cylinder 107 and piston 108. It can be appreciated that under an operator's control, both of the floor sections may be moved in unison or they may be separated by the actuation of cylinder 107 and piston 108 and subsequently moved in unison by actuating cylinder 105 and piston 106 or any other combination of movements and relationships may be achieved.

With reference to FIGURE 13, a schematic diagram is shown illustrating the flow of hydraulic fluid through various lines under control of operator's handle 85. The hydraulic system employs several solenoid operated valves such as valve 110 for example, for selectively connecting desired fluid lines in order to achieve a given action.

FIGURE 15 represents the electrical circuit employed in conjunction with the hydraulic system of FIGURE 13 so that the depression of various buttons electrically connected with terminal board 111, as indicated by the proper indicia, causes various solenoids in the plurality of valves 110 to position a spindle 112 employed in each valve as shown in FIGURE 14 to provide pressure at desired piston and cylinder assemblages to affect the pivoting or transverse movement of floor sections 55 or 56.

An operator causes the car 10 to progress along the monorail track so that the open end of the car will meet with the doorway of a waiting transportation vehicle. If the door of the vehicle is extremely wide, the operator sets the proper push button settings on his control panel and actuates handle 85 to move both floor sections 55 and 56 transversely with respect to the car in order to properly align with the width of the doorway. However, if the doorway is narrow, the operator has the choice of employing either floor section 55 or floor section 56 independently of its other floor section and this selection is also under the push button control of the operator in combination with actuation of the control handle 85.

The present invention is presented as an optimum device for facilitating the movement of passengers or cargo from a second level terminal concourse to the door of modern transports such as various types of aircraft. The car 10 is in the form of an enclosed walkway, mounted adjacent to the elevated floor exterior of a terminal building. To provide clearance for aircraft propellers for example, the car may be placed in its retracted position as shown in broken lines in FIGURE 1. The car can be traversed for a distance along the overhead rail 31 attached to the building structure or to an independent framework.

The car 10 is therefore constructed for three way adjustment i.e., up-down, right-left, to and from the vehicle. The car comprises, in general, a housing or body shell, an articulated floor and a vehicle mating vestibule 65. The vestibule can be adjusted to provide for exact positioning to the vehicle door by means of the articulated floor, which can be moved up and down for variations in the vertical positions of the vehicle floor. Also, the outboard end of the articulated floor can be moved approximately two feet for example across the vestibule opening to match the longitudinal door positions. The entrance door in the side of the car is designed for alignment with the terminal entrance 16 under varying positions of the airplane, thus precluding the need for a telescoping arrangement. However, it will be appreciated that such a telescoping arrangement may be employed if desired.

The car in the present invention incorporates a self-contained hydraulic system which is powered by an A.C. electric motor. This hydraulic system furnishes power to the car rail drive system, the articulated floor device 53 and the vestibule floor positioning actuating mechanism 57.

The mounting features of the car and side rail 76 to eliminate sway provide for stability during movement of personnel and/or cargo through the car and allow positioning of the car at the entrance of the aircraft within seconds.

With reference to FIGURE 5, another embodiment of the suspension means for the car is shown which includes a pair of parallel rails 110 and 111 which is supported beneath beam member 112. The car is supported on the parallel rails, or as commonly referred to "bi-rails," by means which are similar to the supporting and drive mechanism shown in FIGURES 3 and 4. Therefore, it is seen that the car of the present invention is not dependent upon support of a single rail 31, but may be supported from several rails such as rails 110 and 111.

Having described only a typical form of the invention, I do not wish to be limited to the specific details herein set forth, but wish to reserve to myself any variations or modifications that may appear to those skilled in the art and fall within the scope of the following claims.

I claim:

1. A passenger loading and unloading apparatus adapted to be moved to and from a terminal building wherein the building entrance is at least one floor level above ground, a passageway comprising, a main section and a vestibule pivotally carried therewith to raise and lower relative to the ground, fixed means supporting and suspending the main section above ground level and arranged in close proximity to the building for movement relative to the building entrance, and power means carried on the main section for moving the main section on its supporting means to and from the building entrance.

2. A passenger loading and unloading apparatus adapted to be moved to and from a terminal building wherein the building entrance is at least one floor level above ground, a passageway comprising, an enclosed main section having an entrance and carrying a vestibule having an exit, the vestibule being pivotally connected to the main section, means carried on the main section and operatively coupled to the vestibule for raising and lowering the vestibule exit relative to the ground, means for supporting the main section above the ground adjacent the building for movement relative to the building, and power means carried on the main section for moving the main section on its supporting means to and from the building for aligning the loading entrance with the building entrance.

3. A passenger loading and unloading apparatus adapted to be moved between a terminal building wherein the building entrance is at least one floor level above ground, and a transportation vehicle, an elevated vehicular passageway comprising, an enclosed main section having an entrance connectable with the building entrance and including an enclosed vestibule having an exit adapted to mate with the vehicle door, the vestibule being pivotally connected to the main section and having a floor comprised of two parts, said floor being divided unequally on an axis parallel to the longitudinal axis of the vestibule, said parts positionable laterally across the width of the vestibule for selective mating with the vehicle door, actuating means carried on the vestibule and operatively connected to the floor thereof for positioning the floor, means carried on the main section and operatively coupled to the vestibule for raising and lowering the vestibule exit relative to the ground, means supporting and elevating the main section above the ground at least one floor level adjacent the building for rectilinear movement relative to the building, and power means carried on the main section for moving the main section on its supporting means to and from the building for aligning the loading entrance of the main section with the building entrance and the vestibule exit with the vehicle door.

4. A passenger loading and unloading apparatus adapted to be moved between a terminal building wherein the building entrance is at least one floor level above ground, and a transportation vehicle having a passenger door, an elevated passageway comprising, an enclosed main section having an entrance connectable with the building entrance, an enclosed vestibule having an exit adapted to mate with the vehicle door, the vestibule being pivotally connected to the main section and having a floor segmented on an axis parallel to the longitudinal axis of the vestibule and positionable across the width of the vestibule for selective mating with the varying widths of the vehicle doors, actuating means carried on the vestibule and operatively connected to the floor thereof for selectively positioning the floor and its segments, means carried on the main section operatively coupled to the vestibule for raising and lowering the vestibule exit relative to the ground to adjust for varying vehicle door heights from the ground, means supporting and elevating the main section above the ground at least one floor level adjacent the building for rectilinear movement relative to the side of the building, and power means carried on the main section for moving the main section on its supporting means to and from the building parallel to the side thereof for aligning the loading entrance of the main section with the building entrance and the vestibule exit with the vehicle door.

5. A passenger loading and unloading apparatus adapted to be moved between a terminal building wherein the building entrance is at least one floor level above ground, and a transportation vehicle having a passenger access door, an elevated passageway comprising, an enclosed main section having an entrance connectable with the building entrance, an enclosed vestibule having an exit adapted to mate with the vehicle door, the vestibule being pivotally connected to the main section and having a floor segmented on an axis parallel to the longitudinal axis of the vestibule and positionable across the width of the vestibule for selective mating with the varying widths of vehicle doors, actuating means carried on the vestibule and operatively connected to the floor thereof for selectively positioning the floor and its segments, means carried on the main section operatively coupled to the vestibule for raising and lowering the vestibule exit relative to the ground to adjust for varying vehicle door heights from the ground, at least one supporting beam for suspending the main section above the ground at least one floor level adjacent the building for rectilinear movement relative to the side of the building, means connected to the main section and associated with the supporting beam to restrict main section sway and to stabilize the suspension of the main section on the supporting beam, and power means carried on the main section for moving the suspended main section on its supporting beam to and from the building parallel to the side thereof for aligning the loading entrance of the main section with the building entrance and the vestibule exit with the vehicle door.

6. A passenger loading and unloading apparatus adapted to be moved to and from a terminal building wherein the building entrance is at least one floor level above ground, an elevated vehicular passageway comprising, an enclosed main section having an entrance and including an enclosed vestibule having an open end exit, the vestibule being pivotally connected to the main section for vertical movement, means carried on the main section and operatively coupled to the vestibule for raising and lowering the vestibule exit relative to the ground, stationary means supporting and suspending the main section above the ground at least one floor level adjacent the building for rectilinear movement relative to the side of the building, and power means carried on the main section cooperating with the stationary means for moving the main section on its supporting means to and from the building for aligning the loading entrance of the main section with the building entrance.

7. A passenger loading and unloading apparatus adapted to be moved between a terminal building wherein the building entrance is at least one floor level above ground and a transportation vehicle, an elevated passageway comprising, an enclosed main section having an entrance connectable with the building entrance and including an enclosed vestibule having an exit adapted to mate with the vehicle door, the vestibule being pivotally connected to the main section for vertical movement, means carried on the main section and operatively coupled to the vestibule for raising and lowering the vestibule exit relative to the ground, stationary means supporting and suspending the main section above the ground at least one floor level adjacent the building for rectilinear movement relative to the building, and power means carried on the main section cooperating with the stationary means for moving the main section on its supporting stationary means to and from the building for aligning the loading enrance of the main section with the building entrance and the vestibule exit with the vehicle door.

8. A movable passageway for loading and unloading passengers comprising, an enclosed main section, a floor section pivotally carried on the main section and having a free end and a pivoted end, means for lowering and raising the free end of the floor section relative to the ground, an enclosed vestibule carried on the free end of the floor section and pivotally mounted on the main section for vertical movement, stationary means movably supporting and suspending the main section and vestibule above ground level, and means for powering the main section along its stationary support means.

9. A movable passageway for loading and unloading passengers comprising, an enclosed main section, a floor section divided into two parts along the longitudinal axis of the passageway and pivotally carried on the main section and having a free end and a pivoted end, means for lowering and raising the free end of the floor section relative to the ground, an enclosed vestibule mounted on the free end of the floor section, means for positioning the free end of the floor section laterally of the passageway, means supporting and suspending the main section and vestibule above the ground, and means for powering the main section along and beneath its support means.

10. A movable passageway for loading and unloading passengers comprising, an enclosed main section, a floor having a section having a pair of segments divided along the longitudinal axis of the passageway pivotally carried on the main section, means for lowering and raising the free end of the floor section vertically relative to the ground, an enclosed vestibule mounted on the free end of the floor section said vestibule being partially enclosed by the main section, means for positioning the free end of the floor section laterally of the passageway relative to each other for adjustment to a selected width, means supporting and suspending the main section and vestibule above the ground, and means for powering the main section along and beneath its support means.

References Cited in the file of this patent

UNITED STATES PATENTS

| | | |
|---|---|---|
| 485,708 | Norton | Nov. 8, 1892 |
| 1,305,415 | Steffens | June 3, 1919 |
| 1,315,840 | Hunt | Sept. 9, 1919 |
| 1,455,390 | Davino et al. | May 15, 1923 |
| 1,961,753 | Fish | June 5, 1934 |
| 2,042,765 | Blomberg | June 2, 1936 |
| 2,688,761 | Good et al. | Sept. 14, 1954 |
| 2,689,965 | Fenton | Sept. 28, 1954 |
| 2,700,169 | Henion | Jan. 25, 1955 |
| 2,750,135 | Anderson | June 12, 1956 |
| 2,778,674 | Attendu | Jan. 22, 1957 |
| 2,949,864 | Rubin | Aug. 23, 1960 |